Patented Oct. 13, 1953

2,655,543

UNITED STATES PATENT OFFICE 2,655,543

STABILIZED AROMATIC AMINES

Adrian L. Linch, Wilmington, Del., assignor to E. I. du Pont de Nemours & Company, Wilmington, Del., a corporation of Delaware No Drawing. Application October 6, 1950, Serial No. 188,871

21 Claims. (Cl. 260—576)

This invention relates to aromatic amines which have been stabilized against atmospheric oxidation, particularly by having incorporated therein small proportions of a new class of antioxidants therefor.

It has long been recognized that aromatic amines tend to become rapidly oxidized through contact with air which results in loss of the aromatic amines and decrease in their quality through contamination by the oxidation products. When aromatic amines have acquired a dark color from exposure to air, they are not suitable for the manufacture of azo dyes, pigments, basic colors, vat dyes, pharmaceuticals, rubber chemicals, etc. For example, xylidine will oxidize in 2 to 3 weeks under normal storage conditions to a point which renders it unsuitable for use in azo colors, and para-toluidine oxidizes to a deep red color in 2 to 3 days when stored in the liquid state at 60° C. to 80° C. In practice, such oxidation has been largely avoided by consuming the amines within a few days of their production or the amines have been purified, by distillation or crystallization, just prior to their use. In some cases, the loss of unstabilized amine has been as high as 1% per week and the accumulated oxidation products have adversely affected the yield of substances prepared therefrom, such as azo dyes, by as much as 10%.

In industrial practice, the close scheduling of the production of the amines with the processes in which the amines are consumed has become increasingly less practical. The storage of amines, which deteriorate so that they require purification before use, is prohibitively costly because of the loss of amine by oxidation and the further losses incurred in the purification processes.

Attempts to stabilize aromatic amines, by the use of conventional anti-oxidants employed for stabilizing other substances, have not been commercially successful because such anti-oxidants are inefficient or inoperative. In many cases, such conventional anti-oxidants produce negative results in the aromatic amines; that is, they act as pro-oxygenic catalysts. Also, most metal deactivating agents actually increase the susceptibility of the aromatic amines to attack by atmospheric oxygen.

It has been proposed to stabilize aromatic amines by adding carbon bisulfide thereto, which carbon bisulfide tends to liberate hydrogen sulfide. While carbon bisulfide and hydrogen sulfide are quite effective anti-oxidants for aromatic amines, they are gases which readily escape from the amines, are obnoxious and toxic and present explosion and corrosion hazards which greatly reduce their utility.

It has also been proposed to stabilize certain aromatic amines with aromatic mercaptans. However, such aromatic mercaptans are not particularly effective and, after a short period, invert to pro-oxygenic catalysts. Also, some of such aromatic mercaptans are inoperative with some amines and actually increase the susceptibility of such amines to atmospheric oxidation.

It is an object of my invention to provide a class of aromatic amines containing a new class of compounds which are effective to inhibit oxidation of the amines and which do not invert to pro-oxygenic catalysts. Another object is to provide a class of aromatic amines which are effectively stabilized against atmospheric oxidation, whereby loss of amine by oxidation is prevented, contamination of the amine by oxidation products is reduced and the deleterious effects of the oxidation products in the amine are avoided. A further object is to provide a novel and improved method for stabilizing a specific class of aromatic amines. Further objects are to provide new compositions of matter and to advance the art. Still other objects will appear hereinafter.

The above and other objects may be accomplished in accordance with my invention which comprises incorporating in an aromatic amine containing 1 to 2 benzene rings in which each ring carbon atom is a member of only one ring and which is devoid of acid groups, from about 0.01% to about 0.5% of a member of the group consisting of heterocyclic compounds and their zinc salts in which each heterocyclic compound consists of 2 to 10 carbon atoms, 1 to 3 heterocyclic nitrogen atoms, 1 to 3 sulfur atoms and at least 2 hydrogen atoms and contains a single heterocyclic ring of 5 to 6 atoms composed of at least 2 carbon atoms, a nitrogen atom and 1 to 2 additional atoms selected from the group consisting of sulfur and nitrogen atoms, the substituents an the nitrogen atoms being restricted to hydrogen atoms and the substituents on the carbon atoms of the heterocyclic ring being restricted to at least one member of the group consisting of hydrogen atoms, saturated hydrocarbon radicals, —SH and =S, all carbon-carbon bonds in the heterocyclic compound being single bonds. Thereby, such aromatic amines are effectively stabilized against atmospheric oxidation.

I have found that such heterocyclic compounds and their zinc salts are efficient anti-oxidants for such aromatic amines. They effectively inhibit oxidation of such aromatic amines and prevent loss of the amine by oxidation, reduce contamination of the amine by oxidation products and avoid the synergistic action of the oxidation products in subsequent chemical processes in which the amines are employed. The resulting stabilized aromatic amines may be stored for relatively long periods of time, thereby obviating the necessity for close scheduling of the amine production with the process in which the amine is consumed and usually making costly purification processes unnecessary. Such heterocyclic compounds and their zinc salts are also effective to protect the amines in the processes by which they are manufactured so that higher yields of amine of better quality can be obtained.

The aromatic amines, which may be effectively stabilized in accord with this invention, are those which contain 1 to 2 benzene rings wherein each ring carbon atom is a member of only one benzene ring and which is devoid of acid groups such as carboxyl, sulfate and sulfonic acid groups, including their salts and esters. Generally, my anti-oxidants are ineffective or substantially so in naphthylamines and the like where one or more ring carbon atoms are members of two benzene rings. Preferably, the aromatic amines will contain only 1 to 2 amino groups, unsubstituted or substituted by aryl or alkyl groups. Other permissible substituents on the benzene ring include methyl, chlorine and hydroxyl groups. Representative amines of this class are aniline, toluidines, xylidines, 2-chloro-4-amino toluene, 4-chloro-2-amino toluene, diphenylamine, toluylene diamine, meta phenylene diamine, 4-amino diphenylamine, tolidine, 4,4'-diamino diphenyl methane, para amino phenol and N-isobutyl para amino phenol.

The heterocyclic compounds of my invention are those which consist of 2 to 10 carbon atoms, 1 to 3 heterocyclic nitrogen atoms, 1 to 3 sulfur atoms and at least 2 hydrogen atoms and contain a single heterocyclic ring of 5 to 6 atoms composed of at least 2 carbon atoms, a nitrogen atom and 1 to 2 additional atoms selected from the group consisting of sulfur and nitrogen atoms, the substituents on the nitrogen atoms being restricted to hydrogen atoms and the substituents on the carbon atoms of the heterocyclic ring being restricted to at least one member of the group consisting of hydrogen atoms, saturated hydrocarbon radicals, —SH and =S, all carbon-carbon bonds in the heterocyclic compound being single bonds, and their zinc salts. Unsaturated carbon-carbon bonds, such as those in benzene rings and in thiazoles, tend to result in compounds which are inoperative in at least some aromatic amines. Also, organic substituents on the heterocyclic nitrogens and on the acyclic sulfur atoms tend to result in inoperative compounds. By an "acyclic sulfur atom," I mean one which is outside the ring. Generally, those compounds, which contain one or more acyclic sulfur atoms, may be designated by either of two or more tautomeric formulae, in at least one of which the acyclic sulfur is bonded to both a hydrogen atom and a carbon atom of the heterocyclic ring, and the designation of any such compound by any one of its tautomeric formulae will be understood to mean such compound with any of its assignable formulae.

Preferred classes of heterocyclic compounds comprise those compounds which consist of 2 to 10 carbon atoms, 1 to 2 heterocyclic nitrogen atoms, 2 to 3 sulfur atoms, and at least 2 hydrogen atoms and contains a single heterocyclic ring of 5 to 6 atoms composed of at least 2 carbon atoms, 1 to 2 nitrogen atoms and 1 to 2 sulfur atoms, the substituents on the nitrogen atoms being restricted to hydrogen atoms, each acyclic sulfur atom being bonded solely to both a hydrogen atom and a carbon atom which is a member of the heterocyclic ring, all carbon-carbon bonds in the heterocyclic compound being single bonds, and, particularly, those which contain only 1 sulfur atom in the ring and 1 to 2 acyclic sulfur atoms bonded solely to both a hydrogen atom and a carbon atom which is a member of the heterocyclic ring, and the zinc salts thereof.

Other preferred classes of heterocyclic compounds comprise those compounds which consist of 3 to 10 carbon atoms, 2 to 3 heterocyclic nitrogen atoms, 1 to 3 sulfur atoms, and at least 3 hydrogen atoms and contains a single heterocyclic ring of 5 to 6 atoms composed of 3 to 4 carbon atoms and 2 to 3 nitrogen atoms, the substituents on the nitrogen atoms being restricted to hydrogen atoms, each sulfur atom being an acyclic sulfur atom bonded solely to both a hydrogen atom and a carbon atom which is a member of the heterocyclic ring, all carbon-carbon bonds being single bonds, and the zinc salts of such compounds.

Representative heterocyclic compounds of my invention are listed below with their formulae, including the tautomeric formulae:

2-thiazoline-2-thiol

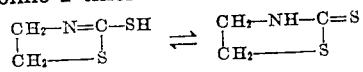

2-thiazoline-2-thiol, zinc salt

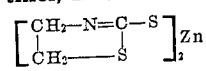

5,5-dimethyl-2-thiazoline-2-thiol, zinc salt

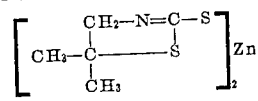

5,6-dihydro-4,6,6-trimethyl - 1,3,4H - thiazine-2-thiol

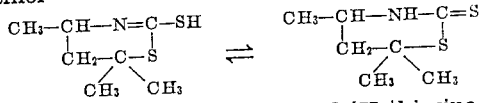

5,6 - dihydro - 4,6,6 - trimethyl-1,3,4H-thiazine-2-thiol, zinc salt

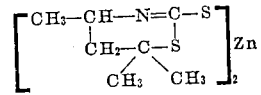

1,3,4-thiadiazole-2,5-dithiol

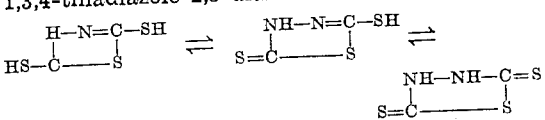

2-imidazoline-2-thiol

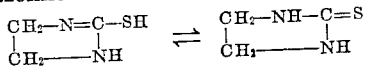

4-methyl-2-imidazoline-2-thiol

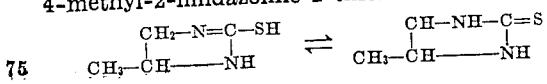

Hexahydro-2-(3H)-benzimidazolethione

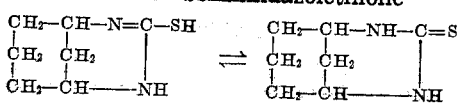

Tetrahydro-5,5-dimethyl-2(1)-pyrimidinethione

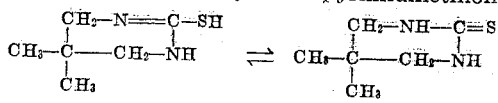

Tetrahydro-4,4,6-trimethyl-2(1)-pyrimidinethione

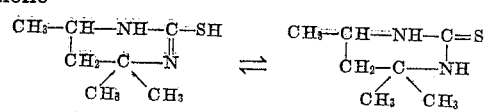

5,5-dimethyl-2,4-dithiohydantoin

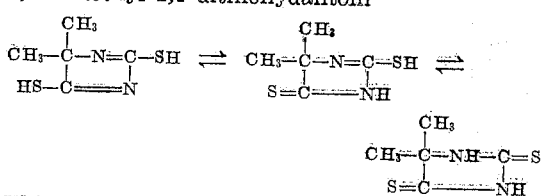

Thialdine

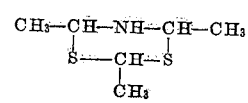

Trithiocyanuric acid

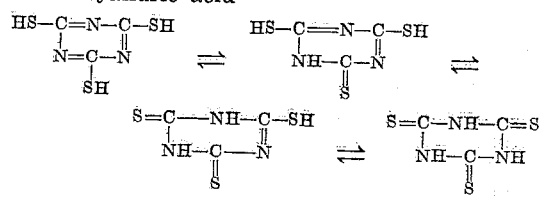

The concentration of the anti-oxidant in the amine should be from about 0.01% to about 0.5% by weight, preferably, from about 0.025% to about 0.3% and usually about 0.1%. While the anti-oxidants of my invention may be effective in concentrations above 0.5%, such higher concentrations will generally be objectionable as they would contaminate the amine to an undesirable extent. Also, concentrations below 0.01% of anti-oxidant will usually show some effect, but such effect will generally be insufficient for practical purposes.

Not all of the heterocyclic anti-oxidants of my invention are equally effective for all of the aromatic amines of my invention. Accordingly, the particular anti-oxidant and the concentration employed for each of the aromatic amines will be chosen in accord with the degree of stability desired. Also, the choice of anti-oxidant and the concentration thereof will be governed by the conditions to which the aromatic amine will be exposed, such as light, temperature and atmospheric contact. Light acts as a catalyst for the oxidation of the aromatic amines and hence, if the amine is to be exposed to light for any substantial period of time, it will be necessary to materially increase the concentration of the anti-oxidant. Furthermore, the rate of oxidation of the aromatic amine increases with increase in temperature, so that the concentration of the anti-oxidant should be increased when the amine is to be subjected to temperatures above atmospheric. Furthermore, the rate of oxidation of the aromatic amine varies with variation in the extent of its exposure to air or oxygen and higher concentrations of anti-oxidant will be required when the amine is to be exposed to air to any material extent. Therefore, it will be understood that the anti-oxidants exhibit their maximum efficiency under storage conditions which involve room temperature or lower temperatures, exclude light, and provide a minimum contact with air or oxygen, as in closed metal tanks and drums.

In order to obtain optimum stability of the amine, I generally prefer to add the heterocyclic anti-oxidant to the aromatic amine as soon as the amine is prepared, particularly, immediately after distillation or during crystallization of the amine. If the amine is distilled, minimum contact thereof with oxygen and maximum stabilization are obtained if the amine is distilled into a receiver containing the anti-oxidant. However, the application of my invention is not restricted to freshly prepared amines, as the anti-oxidant may be added to an aromatic amine which has been partially oxidized, and the anti-oxidant will effectively retard further oxidation of the amine. Also, the anti-oxidants may be added during the manufacture of the amine to avoid atmospheric oxidation during such manufacture, to thereby obtain the amine in higher yields and better quality. In particular, the anti-oxidant may be added to the crude amine, before purification of the amine by crystallization, to thereby inhibit oxidation of the amine during the drying operation.

If the aromatic amine is liquid at normal temperatures, the anti-oxidant may be simply added thereto in the desired concentration and dissolved therein. If the amine is a solid at atmospheric temperatures, it may be melted or dissolved in an inert solvent and the anti-oxidant added to the melted amine or to the solution. Also, if the anti-oxidant is not soluble in the aromatic amine to the extent desired, it may be added as a solution in a suitable solvent, such as ethanol, isopropyl alcohol and ether. The heterocyclic anti-oxidants effectively stabilize the aromatic amines in the presence of inert solvents and diluents.

Examples are given hereinafter, illustrating the effect of representative heterocyclic anti-oxidants of my invention in stabilizing representative aromatic amines, some of such examples including tests with other heterocyclic compounds for purposes of comparison. The tests with liquid aromatic amines were carried out in clear glass bottles filled to approximately 75% of their capacity with the amine or stabilized amine and exposed to diffused daylight at room temperature. The bottles were capped but not sealed airtight. In the absence of practical specific analytical methods for direct determination of the concentration of oxidation products in the preliminary stages, the rate of formation of visible color was adopted as the basis for the determination of anti-oxidant activity. The development of color follows an orderly sequence which is related to the extent of oxidation. In nearly every case, the first visible indication of oxidation is produced by derivatives which impart a yellow color to the system, followed by further oxidation to red compounds. Final stages of oxidative decomposition were evidenced by the appearance of green and blue components. Although the oxidation follows a complex series of reactions, and the constitutions of many of the intermediate products are unknown, the autocatalytic nature of the system can be easily demonstrated.

Evaluation of anti-oxidants, which are effective inhibitors for atmospheric oxidation of the aromatic amines, has disclosed a certain amount of specificity in the chain of reactions. Whereas, certain inhibitors suppress the initial oxidation to yellow derivatives, the oxidation rate of these yellow components, which do form, to the red stage is only slightly reduced. Other inhibitors are only partially effective in suppressing the production of the initial yellow derivatives, but effectively prevent oxidation to red products. Similar results have been observed in the red to blue-green development stages. Therefore, in order to establish a common basis for quantitative evaluation of anti-oxidant efficiency, the rate of formation of each of these three color classes, as well as total visible color formation, was evaluated as optical density determined in a Cenco-Sheard-Sanford Photelometer, using blue (Central Maximum=410 mu), green (525 mu) and red (610 mu) filters and no filter. Distilled water was used as the reference standard, and the density expressed as percent transmission. Experience has shown that the use of aromatic amines, darker than a red-amber color, in chemical processes does not produce satisfactory results. Therefore, when oxidation has progressed to an extent sufficient to reduce the total light transmission below 75%, blue transmission below 20%, green below 60% and red below 95%, the amine is considered to be unsuitable for use without purification. The sum of the number of days required to reach each of these four values is designated as the index. The anti-oxidant index is obtained by subtracting the index of the unstabilized control sample from the index of the stabilized material. This method minimizes the small variations in oxidation susceptibility exhibited by individual production lots of most amines.

Evaluation of those amines, which are normally solid at room temperature, was carried out somewhat differently. The anti-oxidant was dissolved in the amine at a temperature sufficiently high to maintain a liquid state. The test was then conducted at that temperature, or the solution was permitted to freeze and the test continued at normal temperature. Since light density measurements were not practical, the progress of the oxidation was estimated visually. The amine was considered unsuitable for use when the color change had progressed to a dark red, dark brown, or dark lavender shade. Since a control sample, containing no anti-oxidant, was tested at the same time, personal variations in judgment of color depth largely cancelled out. In order to place these evaluations on the same index basis adopted for liquid amines, the number of days elapsed to the end point was multiplied by four. In several cases, the crystallizing point was used as the criterion of anti-oxidant efficiency.

In order to further show the effectiveness of the anti-oxidants of my invention, the ratio of the stability of the stabilized amine to the stability of the unstabilized amine was calculated by dividing the index of the stabilized amine by the index of the unstabilized amine (Control Index). This ratio is given in the examples as the "Stability Ratio." This Stability Ratio expresses the relation of the storage life of the stabilized amine to the storage life of the unstabilized amine under the same conditions. For example, a Stability Ratio of 2 indicates that the stabilized amine requires twice as long as the unstabilized amine to reach the final stage of oxidative decomposition where it is considered to be unsuitable for most uses; that is, the stabilized amine has a storage life 2 times that of the unstabilized amine.

EXAMPLE I

Aniline

Reagent grade aniline was redistilled under reduced pressure to remove colored oxidation products and obtain a water white product for testing. The following table summarizes the results from stability evaluations conducted at room temperature.

[Control index (unstabilized)=408]

| Anti-oxidant | Concentration, percent | Anti-oxidant index | Stability ratio |
| --- | --- | --- | --- |
| 1. 2-thiazoline-2-thiol | 0.1 | 240 | 1.59 |
| 2. 2-thiazoline-2-thiol, zinc salt | .1 | 140 | 1.34 |
| 3. 1,3,4-thiadiazole-2,5-dithiol | .1 | 650 | 2.59 |
| 4. 2-imidazoline-2-thiol | .1 | 120 | 1.3 |
| 5. 4-methyl-2-imidazoline-2-thiol | .1 | 120 | 1.3 |
| 6. Thialdine | .1 | 220 | 1.54 |
| 7. 2-(benzylmercapto)-2-thiazoline | .1 | −140 | .65 |
| 8. 4-ethyl-2-thiazolethiol | .1 | −30 | .92 |
| 9. 2-benzothiazolethiol | .1 | −140 | .65 |

Compounds 7, 8 and 9 are included for comparison and, as shown, actually accelerated the oxidation of aniline.

EXAMPLE II

Ortho toluidine

The amine to be stabilized was a commercial grade of ortho toluidine which distilled from 5 cc. to 95 cc. over a range of 1.0° C. including 200.2° C., contained not less than 99.0% total toluidine by diazotization, and was completely soluble in 10% hydrochloric acid. The ortho toluidine was re-distilled at 20 mm. pressure to separate it from colored, non-volatile impurities and to obtain a colorless product. The following table summarizes the results obtained from stability tests made at room temperature.

[Control index (unstabilized o-toluidine)=210.]

| Anti-oxidant | Concentration, percent | Anti-oxidant index | Stability ratio |
| --- | --- | --- | --- |
| 1. 2-thiazoline-2-thiol | 0.1 | 370 | 2.76 |
| 2. 2-thiazoline-2-thiol, zinc salt | .1 | 520 | 3.48 |
| 3. 5,5-dimethyl-2-thiazoline-2-thiol, zinc salt | .1 | 260 | 2.24 |
| 4. 5,6-dihydro-4,6,6-trimethyl-1,3,4H-thiazine-2-thiol | .1 | 320 | 2.52 |
| 5. 5,6-dihydro-4,6,6-trimethyl-1,3,4H-thiazine-2-thiol, zinc salt | .1 | 410 | 2.95 |
| 6. 1,3,4-thiadiazole-2,5-dithiol | .1 | 270 | 2.28 |
| 7. 2-imidazoline-2-thiol | .1 | 210 | 2.0 |
| 8. 4-methyl-2-imidazoline-2-thiol | .1 | 290 | 2.38 |
| 9. Hexahydro-2(3H)-benzimidazolethione | .1 | 180 | 1.86 |
| 10. Tetrahydro-5,5-dimethyl-2(1)-pyrimidinethione | .1 | 60 | 1.29 |
| 11. Tetrahydro-4,4,6-trimethyl-2(1)-pyrimidinethione | .1 | 140 | 1.67 |
| 12. 5,5-dimethyl-2,4-dithiohydantoin | .1 | 160 | 1.75 |
| 13. Thialdine | .1 | 180 | 1.86 |
| 14. Trithiocyanuric acid | .1 | 430 | 3.05 |
| 15. 2-mercapto benzoxazole | .1 | −170 | .19 |
| 16. 2-amino benzothiazole | .1 | −120 | .43 |

Compounds 15 and 16 are included for comparison and, as shown, greatly accelerated the oxidation of ortho toluidine.

EXAMPLE III

Meta toluidine

A commercial grade of meta toluidine initially distilled over a range of 1.0° C. from 5 cc. to 95 cc. including 203.3° C., contained not less than 98% meta toluidine by diazotization in the presence of HBr, and was completely soluble in 10% HCl. Such meta toluidine was re-distilled to obtain a water white product for stability evaluation. The following table summarizes the results obtained from stability tests made at room temperature.

[Control index (unstabilized meta toluidine)=190.]

| Anti-oxidant | Concentration, percent | Anti-oxidant index | Stability ratio |
|---|---|---|---|
| 1. 2-thiazoline-2-thiol | 0.1 | 170 | 1.9 |
| 2. 2-thiazoline-2-thiol, zinc salt | .1 | 80 | 1.42 |
| 3. 5,6-dihydro-4,6,6-trimethyl-1,3,4H-thiazine-2-thiol | .1 | 90 | 1.47 |
| 4. 5,6-dihydro-4,6,6-trimethyl-1,3,4H-thiazine-2-thiol, zinc salt | .1 | 60 | 1.32 |
| 5. 1,3,4-thiadiazole-2,5-dithiol | .1 | 22 | 1.12 |
| 6. Tetrahydro-5,5-dimethyl-2(1)-pyrimidinethione | .1 | 50 | 1.26 |
| 7. Thialdine | .1 | 200 | 2.05 |
| 8. Trithiocyanuric acid | .1 | 30 | 1.16 |

EXAMPLE IV

Para toluidine

Different production lots of para toluidine were distilled under reduced pressure to obtain water white products for testing and tested at 70° C. or 60° C. in open bottles in an air oven in order to simulate industrial plant storage conditions, and at room temperature (RT). While most lots have an index of 8 at 70° C., some lots are more resistant to oxidation. Also, the resistance to oxidation decreases rapidly with increase in temperature. Except where otherwise indicated in the following table, the tests were carried out at 70° C. and the unstabilized para toluidine had an index of 8. Where the unstabilized para toluidine had a different index under the conditions of the test, such index is shown in parentheses.

| Anti-oxidant | Concentration, percent | Anti-oxidant index | Stability ratio |
|---|---|---|---|
| 1. 2-thiazoline-2-thiol | 0.1 | 24 | 4.0 |
| 2. 2-thiazoline-2-thiol, zinc salt | .1 | 84 | 11.5 |
|  | .025 | (120) 400 (RT) 1 | 4.3 |
|  | .1 | (340) 1,470 (RT) 1 | 5.3 |
| 3. 5,5-dimethyl-2-thiazoline-2-thiol, zinc salt | .1 | 28 | 4.5 |
| 4. 5,6-dihydro-4,6,6-trimethyl-1,3,4H-thiazine-2-thiol, zinc salt | .1 | 20 | 3.5 |
| 5. 1,3,4-thiadiazole-2,5-dithiol | .1 | (12) 44 | 4.7 |
| 6. 2-imidazoline-2-thiol | .1 | 64 | 9.0 |
|  | .1 | (12) 112 (60° C.) | 10.3 |
| 7. 4-methyl-2-imidazoline-2-thiol | .1 | 40 | 6.0 |
|  | .1 | (12) 112 (60° C.) | 10.3 |
| 8. Hexahydro-2(3H)-benzimidazolethione | .1 | 80 | 11.0 |
| 9. Tetrahydro-5,5-dimethyl-2-(1)-pyrimidinethione | .1 | (12) 88 | 8.3 |
|  | .1 | (12) 156 (60° C.) | 14.0 |
| 10. Tetrahydro-4,6,6-trimethyl-2(1)-pyrimidinethione | .1 | 40 | 6.0 |
|  | .1 | (12) 100 (60° C.) | 9.3 |
| 11. Trithiocyanuric acid | .1 | (12) 8 | 1.7 |

1 Opposite anti-oxidant 2, the para toluidine, having an index of 120, was in flake form while that, having an index of 340, was in the form of a cast solid mass.

EXAMPLE V

Xylidines

META XYLIDINE

Two hundred pounds of freshly distilled meta xylidine was run into each of two 55 gallon steel drums. To one, 0.1 pound of thialdine was added, and both stored under normal operating building temperature (25°-40° C.). The color density of the inhibited xylidine, expressed as percent transmission, increased very slowly, but considerable color developed in the control which indicated relatively rapid oxidation over a period of eight weeks.

| Filter | Initial transmission 1 | | Final transmission—23 weeks | |
|---|---|---|---|---|
|  | Control | Stabilized | Control | Stabilized |
| Blue | 65.5 | 75.5 | 2.5 | 13.5 |
| Green | 88.5 | 93.5 | 4.5 | 58.5 |
| Red | 97.0 | 97.5 | 51.0 | 87.0 |
| None | 90.0 | 93.0 | 23.5 | 67.5 |

1 Determined 24 hours after distillation.

PARA XYLIDINE

Similar results were obtained by inhibiting oxidative decomposition of para xylidine with 0.1% 2-thiazoline-2-thiol. Samples were stored at room temperature in clear glass containers in daylight for 10 weeks.

| Filter | Initial transmission | | Final transmission | |
|---|---|---|---|---|
|  | Control | Stabilized | Control | Stabilized |
| Blue | 93.0 | 90.5 | 8.5 | 41.5 |
| Green | 97.5 | 97.0 | 17.5 | 49.0 |
| Red | 100 | 100 | 70.5 | 81.0 |
| None | 100 | 100 | 38.5 | 62.0 |

MIXED XYLIDINES

A mixture of isomeric xylidines was obtained by reduction of nitro xylene isomers produced by nitration of 3° xylene, which mixture contained more than 99.0% total amines calculated as xylidine, no material insoluble in 10% HCl, less than 0.15% nitro xylene as determined by titanous sulfate reduction, and distilled over the range 214.0° C. (first drop) to 223° C. (95% point) at 760 mm. This mixture was distilled under reduced pressure to obtain a water white product for the evaluation of anti-oxidants. The following table summarizes the results obtained from stability tests made in clear glass in daylight at room temperature.

[Control index (unstabilized xylidines)=70.]

| Anti-oxidant | Concentration, percent | Anti-oxidant index | Stability ratio |
|---|---|---|---|
| 1. 2-thiazoline-2-thiol | 0.1 | 270 | 4.9 |
| 2. 2-thiazoline-2-thiol, zinc salt | .1 | 410 | 6.9 |
| 3. 5,6-dihydro-4,6,6-trimethyl-1,3,4H-thiazine-2-thiol | .1 | 290 | 5.15 |
| 4. Thialdine | .1 | 360 | 6.15 |

EXAMPLE VI

2-chloro-4-amino toluene

The commercial product crystallized at 21.2° C., had a nitrite absorption value above 96.0%, and contained more than 24.0% chlorine. It was distilled at 10 mm. pressure to obtain a water white 2-chloro-4-amino toluene for evaluation of response to anti-oxidants. The following table summarizes the results obtained from the tests:

[Control index (unstabilized amine)=90.]

| Anti-oxidant | Concentration, percent | Anti-oxidant index | Stability ratio |
|---|---|---|---|
| 1. 2-thiazoline-2-thiol | 0.1 | 750 | 9.3 |
| 2. 2-thiazoline-2-thiol, zinc salt | .1 | 1000 | 12.1 |

EXAMPLE VII

*4-chloro-2-amino toluene*

A commercial grade product, containing more than 98% 4-chloro-2-amino toluene, was distilled at 20 mm. pressure to remove colored impurities. The following table summarizes the results collected from stability tests made at room temperature in daylight exposure:

[Control index (unstabilized aliquot)=250.]

| Anti-oxidant | Concentration, percent | Anti-oxidant index | Stability ratio |
|---|---|---|---|
| 1. 2-thiazoline-2-thiol | 0.1 | 290 | 2.2 |
| 2. 2-thiazoline-2-thiol, zinc salt | .1 | 340 | 2.4 |
| 3. Thialdine | .1 | 320 | 2.3 |

EXAMPLE VIII

*Diphenylamine*

The utility of the heterocyclic compounds is not limited to application in relatively pure aromatic amines, but can be applied to the preservation of such amines in mixtures with other materials. For example, diphenylamine, emulsified in a mixture containing 30% benzene, 40% water and sufficient colloidal clay to stabilize and thicken the emulsion, decomposed in a clear glass bottle exposed to direct sunlight to produce dark grey-blue oxidation products in 2 to 3 hours. The same formulation, made up with diphenylamine containing 0.25% 2-thiazoline-2-thiol, was exposed for five days before a red brown discoloration appeared on the surface of the sample. Screening out part of the actinic light rays by conducting the tests in brown glass bottles increased the anti-oxidant effect to a level which permitted no color development over a period of two weeks' direct sunlight exposure.

EXAMPLE IX

*Diamines*

A sample of toluylene diamine (2,4-diamino toluene), which had a melting range 97.4–96.8° C., was distilled at 2–3 mm. pressure and 141–142° C. vapor temperature to obtain a colorless product for anti-oxidant evaluation. Thialdine was dissolved in the molten amine in concentrations of 0.1% and 0.25% at 98°–100° C., and the samples allowed to solidify in clear glass bottles. The storage tests were conducted at room temperature in diffused daylight. Not only was color used as a criterion of oxidation progress, but the appearance of a black tar was considered as the useful limit of anti-oxidant life. The unstabilized amine had an index of about 4. The samples of stabilized amine had indexes of 16 and 24, respectively, which correspond to anti-oxidant indexes of 12 and 20 and stability ratios of 4 and 6, respectively.

Similar results may be obtained by the addition of anti-oxidants selected from this class of heterocyclic compounds to other freshly purified phenylene diamines such as meta phenylene diamine. For example, freshly distilled, commercial meta phenylene diamine, which crystallized at 62.85° C., was protected from atmospheric oxidation at 70°±2° C. as shown in the following table.

[Control index=4.]

| Anti-oxidant | Concentration, percent | Anti-oxidant index | Stability ratio |
|---|---|---|---|
| 1. 2-thiazoline-2-thiol, zinc salt | 0.1 | 4 | 2.0 |
| 2. Thialdine | .1 | 16 | 5.0 |
| 3. Trithiocyanuric acid | .1 | 12 | 4.0 |

EXAMPLE X

*4-amino diphenylamine*

A sample of distilled para amino diphenylamine was taken from a plant still product receiver, and kept molten until aliquots could be removed for testing the activity of anti-oxidants. Although a blue-violet color had developed during the short exposure (less than an hour), the results of the evaluation were distinct. The crystallizing point of the initial sample was 69.8° C. The aliquots, after thorough mixing at 80–85° C., were allowed to crystallize and the evaluation made at room temperature. The control (no inhibitor) froze to a pale pink solid, but, during a 24 hour storage period of exposure to light and air, developed a dark red-lavender color, and the formation of a black tar, which wetted the sides of the sample bottle, was quite noticeable. In the presence of inhibitors, the suppression of oxidative decomposition to a similar end point is evaluated in terms of anti-oxidant index as follows:

[Control index=4.]

| Anti-oxidant | Concentration, percent | Anti-oxidant index | Stability ratio |
|---|---|---|---|
| 1. 2-thiazoline-2-thiol, zinc salt | 0.1 | 28 | 8.0 |
| 2. Thialdine | .1 | 940 | 236.0 |

EXAMPLE XI

*Tolidine (3,3' dimethyl 4,4' diamino diphenyl)*

About 0.05% of 2-thiazoline-2-thiol, zinc salt was dissolved in an aliquot of an inversion mixture of tolidine, isopropyl alcohol, ortho toluidine, palladium hydrogenation catalyst, and isomeric by-products obtained from the inversion of crude ortho hydrazo toluene with hydrochloric acid followed by alkalifying with sodium hydroxide. The aliquots were allowed to stand at room temperature in clear glass bottles exposed to diffused daylight for five days, then heated at 75°–80° C. for six days. The tolidine was recovered by filtration, and washed with toluene and water to remove impurities. The tolidine, from the unstabilized aliquot, had a melting point of 125.6° C., while that, from the stabilized aliquot, had a melting point of 126.5° C. The stabilized sample was much lighter in color, and the higher melting point confirmed lower concentration of oxidation products.

The use of my anti-oxidants to inhibit atmospheric decomposition of diamine diaryl derivatives has been extended to include 4,4' diamino diphenyl methane which, in the absence of inhibitors, darkens rapidly with a corresponding loss in strength of the amine. For example, 1.5 gms. of thialdine was charged into a still receiver into which 345 gms. of 4,4'-diamino diphenyl methane was distilled at 8 mm. (crystallizing point 84.8° C.). The thialdine was thoroughly mixed with the water white molten amine at the finish of the distillation, and the mixture was ground to a fine white powder after solidifying. The powdered amine remained white, while exposed to diffused daylight, after a 6 month period, whereas product, distilled from the same crude amine but unprotected, developed a dark brown color after several days' exposure.

EXAMPLE XII

*Para amino phenol*

The efficacy of my anti-oxidants has been applied to the protection of para amino phenol during purification by crystallizing from water and drying, as well as to inhibiting oxidative decomposition during storage. As an illustration: 124 gms. of crude para amino phenol was dissolved in 4200 cc. of an aqueous solution containing 140 gms. of sodium bisulfite and 16 gms. of sodium hydroxide by heating to boiling. To the hot solution, 42 gms. of decolorizing charcoal was added, and the mixture filtered hot. To one portion, 0.08% thialdine (based on total volume) was added. The solutions were allowed to cool to room temperature, set aside to crystallize over night, chilled to 10°–15° C., filtered, and dried in a 70° C. oven for 20 hours. The surface of the unprotected control crystals was dark amber in color, whereas, the crystals protected by thialdine were white.

EXAMPLE XIII

*N-isobutyl para amino phenol*

A commercial grade of N-isobutyl para amino phenol was distilled under reduced pressure (boiling point at 0.5 mm.=149° C.), and the distillate collected under nitrogen to prevent oxidation until the anti-oxidants could be dissolved in test aliquots. Two sets of evaluations, one in clear glass, open top glass bottles at room temperature exposed to daylight, the other in open top bottles at 50–60° C. in an oven, were carried out. Progress of oxidation was estimated visually by the progress of color development, and appearance of tar (in the solid samples). When a sufficient concentration of oxidation products had accumulated to impart a dark grey-brown color, the isobutyl para amino phenol was considered unfit for commercial uses. The initial color of the distillate under nitrogen was a pale amber which, in the absence of an anti-oxidant, developed to a dark grey color in less than four days' exposure to the atmosphere.

| Anti-oxidant | Concentration, percent | Effective period, days | |
| --- | --- | --- | --- |
| | | Room temp. | 50–60° C. |
| 1. 2-thiazoline-2-thiol | 0.1 | | 20 |
| 2. Thialdine | .1 | 90 | 20 |

It will be understood that the preceding examples are given solely for illustrative purposes and that I do not intend to limit my invention to the specific embodiments disclosed therein. It will be apparent to those skilled in the art that other aromatic amines, within the class heretofore disclosed, may be similarly stabilized. It will also be apparent that other heterocyclic compounds and their zinc salts, within the class hereinbefore defined, and mixtures of any two or more thereof may be substituted for those of the examples. It will be further apparent that the concentration of the heterocyclic antioxidant in the aromatic amine may also be varied within the limits disclosed. Still further, the stabilized amine may be diluted with inert solvents or with inert liquid or solid diluents.

It will be apparent that by my invention, I am able to provide a class of aromatic amines which are effectively stabilized against oxidation for relatively long periods of time. Thereby, the amines may be stored without material loss in amine or contamination of the amine with deleterious oxidation products and it is unnecessary to schedule the production of the aromatic amines so that they are consumed as rapidly as they are produced. Also, the losses, entailed in purification of oxidized amine, are eliminated or greatly reduced. Accordingly, it is apparent that my invention constitutes a valuable advance in and contribution to the art.

I claim:

1. A composition consisting essentially of an aromatic amine containing 1 to 2 benzene rings in which each ring carbon atom is a member of only one ring and which is also a member of the group consisting of aromatic amines which consist of carbon, hydrogen and the amino nitrogen atoms, aromatic amines which consist of carbon, hydrogen and the amino nitrogen atoms and a chlorine atom, and aromatic amines which consist of carbon, hydrogen and the amino nitrogen atoms and a hydroxyl group, and from about 0.01% to about 0.5% of a member of the group consisting of heterocyclic compounds and their zinc salts in which each heterocyclic compound consists of 2 to 10 carbon atoms, 1 to 3 heterocyclic nitrogen atoms, 1 to 3 sulfur atoms and at least 2 hydrogen atoms and contains a single heterocyclic ring of 5 to 6 atoms composed of at least 2 carbon atoms, a nitrogen atom and 1 to 2 additional atoms selected from the group consisting of sulfur and nitrogen atoms, the substituents on the nitrogen atoms being restricted to hydrogen atoms and the substituents on the carbon atoms of the heterocyclic ring being restricted to at least one member of the group consisting of hydrogen atoms, saturated hydrocarbon radicals, —SH and =S, all carbon-carbon bonds in the heterocyclic compound being single bonds.

2. A composition consisting essentially of an aromatic amine containing 1 to 2 benzene rings in which each ring carbon atom is a member of only one ring and which is also a member of the group consisting of aromatic amines which consist of carbon, hydrogen and the amino nitrogen atoms, aromatic amines which consist of carbon, hydrogen and the amino nitrogen atoms and a chlorine atom, and aromatic amines which consist of carbon, hydrogen and the amino nitrogen atoms and a hydroxyl group, and from about 0.01% to about 0.5% of a heterocyclic compound which consists of 2 to 10 carbon atoms, 1 to 3 heterocyclic nitrogen atoms, 1 to 3 sulfur atoms and at least 2 hydrogen atoms and contains a single heterocyclic ring of 5 to 6 atoms composed of at least 2 carbon atoms, a nitrogen atom and 1 to 2 additional atoms selected from the group consisting of sulfur and nitrogen atoms, the substituents on the nitrogen atoms being restricted to hydrogen atoms and the substituents on the carbon atoms of the heterocyclic ring being restricted to at least one member of the group consisting of hydrogen atoms, saturated hydrocarbon radicals, —SH and =S, all carbon-carbon bonds in the heterocyclic compound being single bonds.

3. A composition consisting essentially of an aromatic amine containing 1 to 2 benzene rings in which each ring carbon atom is a member of only one ring and which is also a member of the group consisting of aromatic amines which consist of carbon, hydrogen and the amino nitrogen atoms, aromatic amines which consist of carbon, hydrogen and the amino nitrogen atoms and a chlorine atom, and aromatic amines which consist of carbon, hydrogen and the amino nitrogen atoms and a hydroxyl group, and from about 0.01% to about 0.5% of a heterocyclic compound which consists of 2 to 10 carbon atoms, 1 to 2 heterocyclic nitrogen atoms, 2 to 3 sulfur atoms, and at least 2 hydrogen atoms and contains a single heterocyclic ring of 5 to 6 atoms composed of at least 2 carbon atoms, 1 to 2 nitrogen atoms and 1 to 2 sulfur atoms, the substituents on the nitrogen atoms being restricted to hydrogen atoms, each sulfur atom, other than those that are members of the heterocyclic ring, being bonded solely to both a hydrogen atom and a carbon atom which is a member of the heterocyclic ring, all carbon-carbon bonds in the heterocyclic compound being single bonds.

4. A composition consisting essentially of an aromatic amine containing 1 to 2 benzene rings in which each ring carbon atom is a member of only one ring and which is also a member of the group consisting of aromatic amines which consist of carbon, hydrogen and the amino nitrogen atoms, aromatic amines which consist of carbon, hydrogen and the amino nitrogen atoms and a chlorine atom, and aromatic amines which consist of carbon, hydrogen and the amino nitrogen atoms and a hydroxyl group, and from about 0.01% to about 0.5% of thialdine.

5. A composition consisting essentially of an aromatic amine containing 1 to 2 benzene rings in which each ring carbon atom is a member of only one ring and which is also a member of the group consisting of aromatic amines which consist of carbon, hydrogen and the amino nitrogen atoms, aromatic amines which consist of carbon, hydrogen and the amino nitrogen atoms and a chlorine atom, and aromatic amines which consist of carbon, hydrogen and the amino nitrogen atoms and a hydroxyl group, and from about 0.01% to about 0.5% of a heterocyclic compound which consists of 2 to 10 carbon atoms, 1 to 2 heterocyclic nitrogen atoms, 2 to 3 sulfur atoms, and at least 2 hydrogen atoms and contains a single heterocyclic ring of 5 to 6 atoms composed of at least 2 carbon atoms, 1 to 2 nitrogen atoms and 1 sulfur atom, the substituents on the nitrogen atoms being restricted to hydrogen atoms, and 1 to 2 of the sulfur atoms being acyclic sulfur atoms bonded solely to both a hydrogen atom and a carbon atom which is a member of the heterocyclic ring, all carbon-carbon bonds in the heterocyclic compound being single bonds.

6. A composition consisting essentially of an aromatic amine containing 1 to 2 benzene rings in which each ring carbon atom is a member of only one ring and which is also a member of the group consisting of aromatic amines which consist of carbon, hydrogen and the amino nitrogen atoms, aromatic amines which consist of carbon, hydrogen and the amino nitrogen atoms and a chlorine atom, and aromatic amines which consist of carbon, hydrogen and the amino nitrogen atoms and a hydroxyl group, and from about 0.01% to about 0.5% of a zinc salt of a heterocyclic compound which consists of 2 to 10 carbon atoms, 1 to 2 heterocyclic nitrogen atoms, 2 to 3 sulfur atoms, and at least 2 hydrogen atoms and contains a single heterocyclic ring of 5 to 6 atoms composed of at least 2 carbon atoms, 1 to 2 nitrogen atoms and 1 sulfur atom, the substituents on the nitrogen atoms being restricted to hydrogen atoms, and 1 to 2 of the sulfur atoms being acyclic sulfur atoms bonded solely to both a hydrogen atom and a carbon atom which is a member of the heterocyclic ring, all carbon-carbon bonds in the heterocyclic compound being single bonds.

7. A composition consisting essentially of an aromatic amine containing 1 to 2 benzene rings in which each ring carbon atom is a member of only one ring and which is also a member of the group consisting of aromatic amines which consist of carbon, hydrogen and the amino nitrogen atoms, aromatic amines which consist of carbon, hydrogen and the amino nitrogen atoms and a chlorine atom, and aromatic amines which consist of carbon, hydrogen and the amino nitrogen atoms and a hydroxyl group, and from about 0.01% to about 0.5% of a heterocyclic compound which consists of 3 to 10 carbon atoms, 2 to 3 heterocyclic nitrogen atoms, 1 to 3 sulfur atoms, and at least 3 hydrogen atoms and contains a single heterocyclic ring of 5 to 6 atoms composed of 3 to 4 carbon atoms and 2 to 3 nitrogen atoms, the substituents on the nitrogen atoms being restricted to hydrogen atoms, each sulfur atom being an acyclic sulfur atom bonded solely to both a hydrogen atom and a carbon atom which is a member of the heterocyclic ring, all carbon-carbon bonds being single bonds.

8. A composition consisting essentially of an aromatic amine containing 1 to 2 amino groups and 1 to 2 benzene rings in which each ring carbon atom is a member of only one ring and which consists of carbon, hydrogen and the amino nitrogen atoms, and from about 0.01% to about 0.5% of a member of the group consisting of heterocyclic compounds and their zinc salts in which each heterocyclic compound consists of 2 to 10 carbon atoms, 1 to 3 heterocyclic nitrogen atoms, 1 to 3 sulfur atoms and at least 2 hydrogen atoms and contains a single heterocyclic ring of 5 to 6 atoms composed of at least 2 carbon atoms, a nitrogen atom and 1 to 2 additional atoms selected from the group consisting of sulfur and nitrogen atoms, the substituents on the nitrogen atoms being restricted to hydrogen atoms and the substituents on the carbon atoms of the heterocyclic ring being restricted to at least one member of the group consisting of hydrogen atoms, saturated hydrocarbon radicals, —SH and =S, all carbon-carbon bonds in the heterocyclic compound being single bonds.

9. A composition consisting essentially of an aromatic amine containing 1 to 2 amino groups and 1 to 2 benzene rings in which each ring carbon atom is a member of only one ring and which consists of carbon, hydrogen and the amino nitrogen atoms, and from about 0.01% to about 0.5% of a heterocyclic compound which consists of 2 to 10 carbon atoms, 1 to 2 heterocyclic nitrogen atoms, 2 to 3 sulfur atoms, and at least 2 hydrogen atoms and contains a single heterocyclic ring of 5 to 6 atoms composed of at least 2 carbon atoms, 1 to 2 nitrogen atoms and 1 to 2 sulfur atoms, the substituents on the nitrogen atoms being restricted to hydrogen atoms, each sulfur atom, other than those that are members of the heterocyclic ring, being bonded solely to both a hydrogen atom and a carbon atom which is a member of the heterocyclic ring, all carbon-carbon bonds in the heterocyclic compound being single bonds.

10. A composition consisting essentially of an aromatic amine containing 1 to 2 amino groups and 1 to 2 benzene rings in which each ring carbon atom is a member of only one ring and which consists of carbon, hydrogen and the amino nitrogen atoms, and from about 0.01% to about 0.5% of thialdine.

11. A composition consisting essentially of a mixture of isomeric xylidines and from about 0.01% to about 0.5% of thialdine.

12. A composition consisting essentially of para amino diphenylamine and from about 0.01% to about 0.5% of thialdine.

13. A composition consisting essentially of an aromatic amine containing 1 to 2 benzene rings in which each ring carbon atom is a member of only one ring and which is also a member of the group consisting of aromatic amines which consist of carbon, hydrogen and the amino nitrogen atoms, aromatic amines which consist of carbon, hydrogen and the amino nitrogen atoms and a chlorine atom, and aromatic amines which consist of carbon, hydrogen and the amino nitrogen atoms and a hydroxyl group, and from about 0.01% to about 0.5% of 2-thiazoline-2-thiol.

14. A composition consisting essentially of an aromatic amine containing 1 to 2 amino groups and 1 to 2 benzene rings in which each ring carbon atom is a member of only one ring and which consists of carbon, hydrogen and the amino nitrogen atoms, and from about 0.01% to about 0.5% of 2-thiazoline-2-thiol.

15. A composition consisting essentially of meta toluidine and from about 0.01% to about 0.5% of 2-thiazoline-2-thiol.

16. A composition consisting essentially of an aromatic amine containing 1 to 2 benzene rings in which each ring carbon atom is a member of only one ring and which is also a member of the group consisting of aromatic amines which consist of carbon, hydrogen and the amino nitrogen atoms, aromatic amines which consist of carbon, hydrogen and the amino nitrogen atoms and a chlorine atom, and aromatic amines which consist of carbon, hydrogen and the amino nitrogen atoms and a hydroxyl group, and from about 0.01% to about 0.5% of the zinc salt of 2-thiazoline-2-thiol.

17. A composition consisting essentially of an aromatic amine containing 1 to 2 amino groups and 1 to 2 benzene rings in which each ring carbon atom is a member of only one ring and which consists of carbon, hydrogen and the amino nitrogen atoms, and from about 0.01% to about 0.5% of the zinc salt of 2-thiazoline-2-thiol.

18. A composition consisting essentially of ortho toluidine and from about 0.01% to about 0.5% of the zinc salt of 2-thiazoline-2-thiol.

19. A composition consisting essentially of an aromatic amine containing 1 to 2 benzene rings in which each ring carbon atom is a member of only one ring and which is also a member of the group consisting of aromatic amines which consist of carbon, hydrogen and the amino nitrogen atoms, aromatic amines which consist of carbon, hydrogen and the amino nitrogen atoms and a chlorine atom, and aromatic amines which consist of carbon, hydrogen and the amino nitrogen atoms and a hydroxyl group, and from about 0.01% to about 0.5% of 2-imidazoline-2-thiol.

20. A composition consisting essentially of an aromatic amine containing 1 to 2 amino groups and 1 to 2 benzene rings in which each ring carbon atom is a member of only one ring and which consists of carbon, hydrogen and the amino nitrogen atoms, and from about 0.01% to about 0.5% of 2-imidazoline-2-thiol.

21. A composition consisting essentially of para toluidine and from about 0.01% to about 0.5% of 2-imidazoline-2-thiol.

ADRIAN L. LINCH.

No references cited.